(12) United States Patent
Sandstrom et al.

(10) Patent No.: US 7,367,369 B2
(45) Date of Patent: May 6, 2008

(54) AIRCRAFT TIRE

(75) Inventors: Paul Harry Sandstrom, Cuyahoga Falls, OH (US); George Frank Balogh, North Canton, OH (US); Steven Wayne Cronin, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 397 days.

(21) Appl. No.: 10/947,669

(22) Filed: Sep. 23, 2004

(65) Prior Publication Data

US 2006/0063878 A1    Mar. 23, 2006

(51) Int. Cl.
*B60C 1/00* (2006.01)
*C08L 9/00* (2006.01)

(52) U.S. Cl. ............... 152/209.1; 152/564; 206/304; 244/100 R; 525/236

(58) Field of Classification Search ............. 152/209.1, 152/564; 206/304; 244/100 R; 525/236
See application file for complete search history.

(56) References Cited

U.S. PATENT DOCUMENTS

| | | | | |
|---|---|---|---|---|
| 3,938,574 A | * | 2/1976 | Burmester et al. ....... | 152/209.1 |
| 5,451,646 A | | 9/1995 | Castner ................. | 526/137 |
| 6,046,266 A | * | 4/2000 | Sandstrom et al. ...... | 524/492 |
| 6,959,744 B2 | * | 11/2005 | Sandstrom et al. ...... | 152/209.5 |
| 7,019,084 B2 | * | 3/2006 | Sandstrom ............. | 525/332.6 |
| 2002/0055568 A1 | | 5/2002 | Cruse et al. ............ | 524/262 |

FOREIGN PATENT DOCUMENTS

EP    1221385 A2  *  7/2002

OTHER PUBLICATIONS

Product Data Sheet Budene® 1280 by The Goodyear Tire & Rubber Company, 1485 East Archwood Avenue, Akron, Ohio. Published at least as early as Apr. 30, 2002.
Page 317, 1991 *Annual Book of ASTM Standards*, vol. 09.01.
Exilon der Kautschuk-Technik by J. Schnetger. Published at least as early as 1991.

* cited by examiner

*Primary Examiner*—Kelechi C. Egwim
(74) *Attorney, Agent, or Firm*—Henry C. Young, Jr.

(57) ABSTRACT

The invention relates to an aircraft tire with a tread having a running surface of a rubber composition which contains elastomers of which a major portion is a specialized cis 1,4-polybutadiene elastomer and a minor portion is cis 1,4-polyisoprene rubber and which contains reinforcement filler comprised of a combination of precipitated silica and defined rubber reinforcing carbon black.

2 Claims, 2 Drawing Sheets

AIRCRAFT TIRE

FIELD OF THE INVENTION

Figure 1:
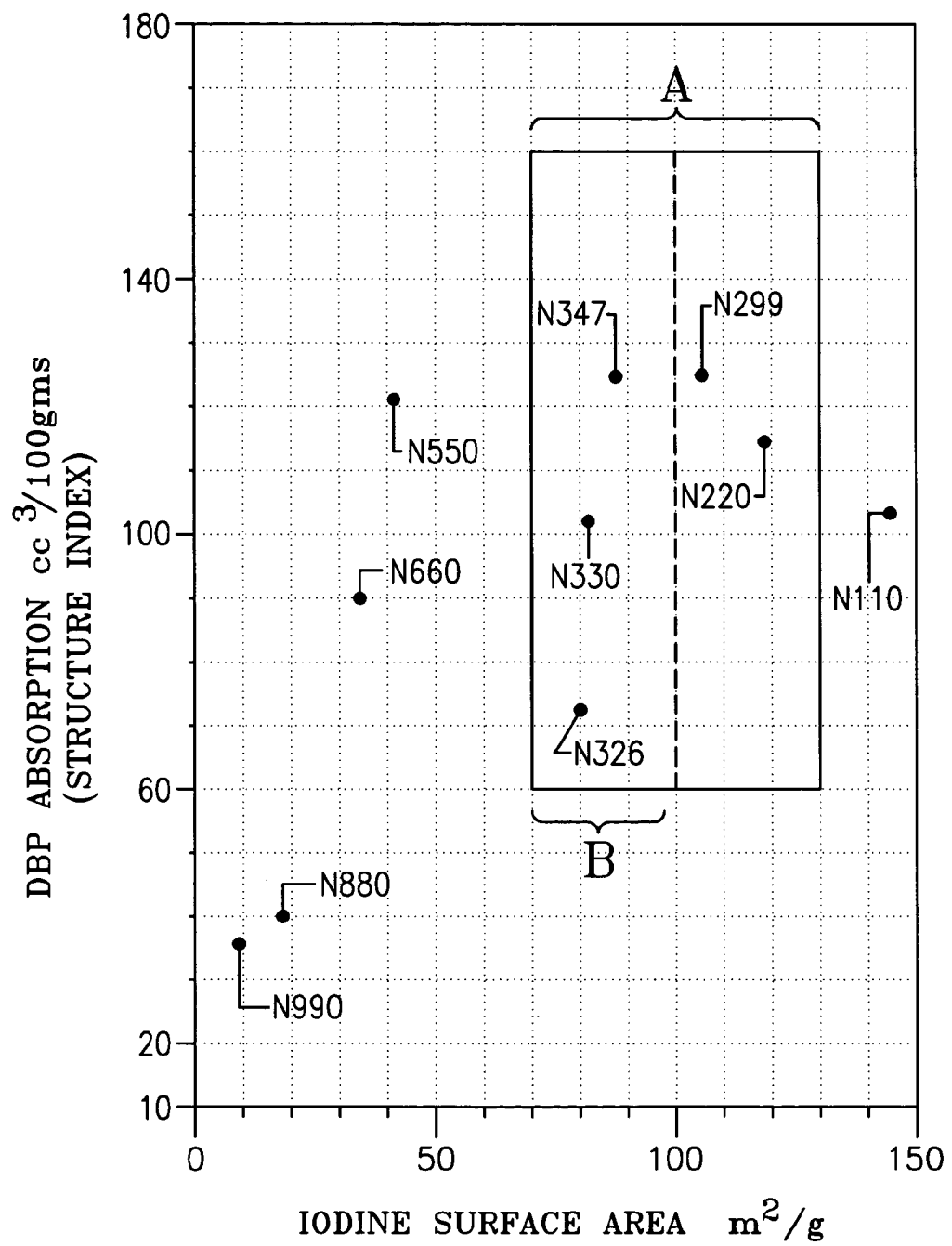

The invention relates to an aircraft tire with a tread having a running surface of a rubber composition which contains elastomers of which a major portion is a specialized cis 1,4-polybutadiene elastomer and a minor portion is cis 1,4-polyisoprene rubber and which contains reinforcement filler comprised of a combination of precipitated silica and defined rubber reinforcing carbon black.

BACKGROUND FOR THE INVENTION

Aircraft tire treads, in contrast to more conventional vehicular tire treads, are subjected to extreme operating conditions which require the tire treads to endure significant forces experienced upon landing of an aircraft as the tire touches ground and instantly accelerates to relatively high speeds under load as well as significant forces experienced upon aircraft takeoffs which require a rapid acceleration to relatively high speeds under load.

In addition, aircraft tires, in contrast to more conventional vehicular tires, are often significantly stiffer in nature as a result of, at least in part, often being composed of a significant plurality of carcass plies, which for some aircraft tires may be as many as 8 or more plies, and as a result tends to be a significantly more hysteretic tire to thereby have a greater propensity for internal heat generation with a resultant greater temperature rise during the working of the tire which impacts negatively upon the heat durability of the tire.

The aforesaid extreme landing and take-off operational conditions for the relatively stiff, relatively hysteretic aircraft tires inherently create a significant rapid temperature rise for the aircraft tread due to internal heat generation for which long term heat durability of the tread rubber composition may be of concern as well as submitting the running surface of the tire tread to significant abrasion forces for which long term tread wear may be of a concern.

In practice, such aircraft tire treads are conventionally composed of a relatively tough, abrasion resistant, natural rubber (and sometimes a minor amount of polybutadiene rubber for the abrasion resistance promoting aspect of the tire tread) based rubber composition which is relatively hysteretic in nature and therefore prone to internal heat generation caused by the aforesaid operationally exerted forces.

A typical significant elastomeric component for such aircraft tread rubber compositions to promote abrasion resistance is the relatively minor amount of cis 1,4-polybutadiene rubber contained in a predominately natural rubber tread rubber composition where the cis 1,4-polybutadiene rubber typically has a moderate number average molecular weight (Mn) in a range of from about 175,000 to about 275,000 and a weight average molecular weight (Mw) in a range of from about 400,000 to about 650,000 with a relatively narrow (low) heterogeneity index (Mw/Mn) in a range of from about 1.5/1 to about 2.5/1.

In practice, the needed abrasion resistance for such aircraft tire tread is typically obtained by the inclusion of the minor amount of the cis 1,4-polybutadiene rubber of moderate molecular weight (to promote abrasion resistance) together with a relatively high loading of rubber reinforcing carbon black (to also promote abrasion resistance).

It is desired herein to provide an aircraft tire tread composition which, in its unvulcanized state can be suitably processed in conventional rubber processing equipment, including acceptably extruded into relatively smooth surfaced tread strips, for which a major portion of the elastomer component of the tread rubber composition is a cis 1,4-polybutadiene rubber (which would ordinarily be expected to have a negative effect upon the rubber composition's processability) to promote resistance to abrasion in the rubber composition's vulcanized state without resorting to the aforesaid high carbon black loading for abrasion resistance which significantly increases internal heat generation and a resultant increase in rate of temperature rise within the tire.

This is considered herein to be a significant challenge, with unspecified alternative adjustments to be made for the aircraft tire tread rubber composition, since the increase in a cis 1,4-butadiene rubber content, and associated reduction in natural rubber content, of the aircraft tire tread rubber composition, would ordinarily be expected to have a negative impact upon the aforesaid processability of the unvulcanized rubber composition, thereby making it more difficult to fabricate (by an extrusion or calendering process) the associated unvulcanized tread component having a relatively smooth surface.

It is well appreciated by those having skill in such art that significant compromises of physical properties of a tire tread rubber composition are sometimes made for various purposes. For example, optimizing an aircraft tire tread rubber composition's increased abrasion resistance by merely increasing its cis 1,4-polybutadiene rubber content may result in relatively disadvantageous results in one or more other desirable properties of an aircraft tire tread rubber composition, including, for example, its aforesaid processability in its unvulcanized state.

Figure 2:
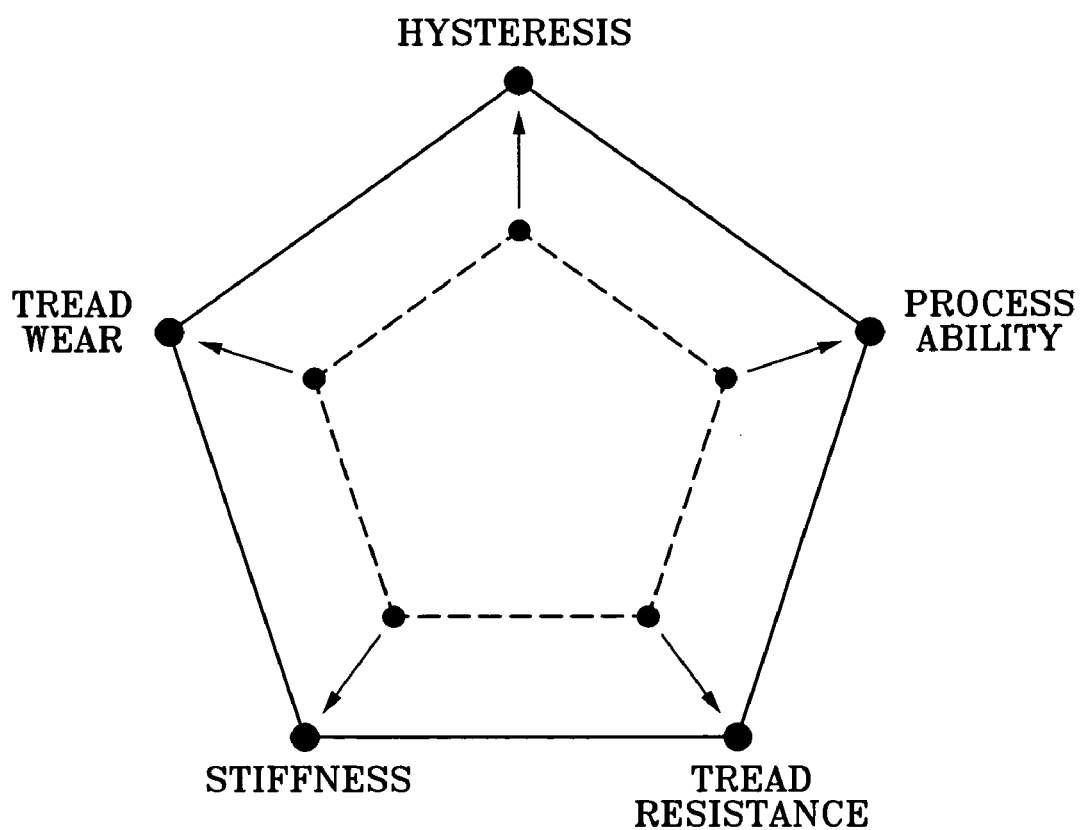

FIG. 2 of the included drawings is provided in a form of an outer and inner pentagraph to illustrate, in a pictorial manner, what are considered herein as being five significant physical properties (unvulcanized and vulcanized properties) of an aircraft tire tread rubber composition.

The five included points of the outer pentagraph representing such properties are, in a counterclockwise direction from the top: Hysteresis (hot 100° C. rebound and tangent delta properties), Treadwear (abrasion resistance), Stiffness (tensile and dynamic shear modulus), Tear Resistance (resistance to tear propagation) and Processability (e.g. smooth extrudates of the unvuilcanized rubber composition).

The individual arrows extending from the inner pentagraph to each of the five points of the outer pentagraph are intended to illustrate a desirable, but typically unrealistic, goal of equally enhancing all of such five physical properties for an aircraft tire tread rubber composition.

It is well known to those having skill in the pertinent art that optimizing one of such properties typically detracts, or has a negative impact, in one or more of the other physical properties.

For example, significantly increasing the cis 1,4-polybutadiene rubber in a natural rubber/polybutadiene aircraft tire rubber tread composition would be expected to have a negative impact on the unvulcanized rubber composition's processability although it may have a beneficial effect on its abrasion resistance.

For example, use of reinforcing filler as a combination of precipitated silica and medium particle sized rubber reinforcing carbon black, instead of carbon black alone, is provided to promote a beneficial reduction in the rubber composition's hysteresis (reduction in internal heat build up) and increase in its tear strength. However, such inclusion of the precipitated silica, particularly with a corresponding reduction in the carbon black, would be expected to have a negative impact upon the rubber composition's abrasion resistance. This facilitates the need for a high cis 1,4-polybutadiene rubber to retain abrasion resistance due to the use of silica and medium sized carbon black.

Therefore, a challenge typically remains to provide a suitably processable (in its unvulcanized state), aircraft tire tread rubber composition in which a major portion of its rubber component is a cis 1,4-polybutadiene rubber which promotes (in its vulcanized state) a combination of both suitable abrasion resistance (e.g. DIN abrasion) and hysteresis (100° C. rebound) physical properties, all of which is considered herein to be a departure from past practice for an aircraft tire tread.

For this invention, a focus is on enhancing the abrasion resistance (e.g. DIN abrasion) and hysteresis (e.g. 100° C. rebound property and tan delta property) of an aircraft tire tread rubber composition while also providing the rubber composition in a form of a suitably processable unvulcanized rubber composition in a sense of providing a relatively smooth surfaced extrudate in a form of an unvulcanized rubber tread component (e.g. tread strip) with a minimization of surface defects for building, molding and curing a tire assembly to form an aircraft tire.

The term "running surface" of the aircraft tire, unless otherwise indicated, means the outer surface of the tread which is intended to be ground-contacting.

In the description of this invention, the terms "rubber" and "elastomer" where used herein, are used interchangeably, unless otherwise provided. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art. The terms "cure" and "vulcanize" are well understood by those having skill in such art and may be used interchangeably unless otherwise provided. In the description of this invention, the term "phr" refers to parts of a respective material per 100 parts by weight of rubber, or elastomer.

The number average molecular weight (Mn) and weight average molecular weight (Mw) of a cis 1,4-polybutadiene elastomer as referenced herein can be suitably determined by gel permeation chromatography (GPC), a method well known to those having skill in such analytical art.

The heterogeneity index of an elastomer (e.g. a cis 1,4-polybutadiene elastomer) is a ratio of its weight average molecular weight (Mw) to its number average molecular weight (Mn), or Mw/Mn. A relatively low heterogeneity index in a range of from about 1.5/1 to about 2.5/1 is indicative of a relatively narrow molecular weight distribution. A greater heterogeneity index in a range of from about 3/1 to about 5/1, indicating a significantly wider disparity between its weight average molecular weight (Mw) and its number average molecular weight (Mn) is indicative of a relatively broad molecular weight distribution.

SUMMARY AND PRACTICE OF THE INVENTION

In accordance with this invention, an aircraft tire is provided having a tread of a rubber composition comprised of, based upon parts by weight per 100 parts by weight rubber (phr):

(A) diene-based elastomers comprised of:
  (1) about 55 to about 95 phr of specialized cis 1,4-polybutadiene elastomer having a microstructure comprised of about 96 to about 99 percent cis 1,4-isomeric units, about 0.1 to about 1 percent trans 1,4-isomeric units and from about 1 to about 3 percent vinyl 1,2-isomeric units; a number average molecular weight (Mn) in a range of from about 75,000 to about 150,000 (relatively low Mn for a cis 1,4-polybutadiene elastomer) and a heterogeneity index (Mw/Mn) in a range of from about 3/1 to about 5/1 (a relatively high heterogeneity index range illustrating a significant disparity between its weight average and number average molecular weights);
  (2) about 5 to about 45 phr of cis 1,4 polyisoprene elastomer (selected from natural cis 1,4-polyisoprene rubber and synthetic cis 1,4-polyisoprene rubber), and
  (3) from zero to about 20, alternately from about 2 to about 15 phr of additional conjugated diene based elastomer selected from styrene/butadiene copolymer rubber (e.g. emulsion polymerization prepared styrene/butadiene copolymer rubber or solvent solution polymerization prepared styrene/butadiene copolymer rubber);

(B) about 20 to about 120 phr of reinforcing filler as a combination of:
  (1) about 10 to about 60 phr of particulate precipitated silica, and
  (2) about 10 to about 60 phr of rubber reinforcing carbon black having a DBP (dibutyl phthalate) value within a range of about 60 to about 160, cc/100 g (ASTM D 2414) and an Iodine value within a range of from about 70 to about 130, preferably from about 70 to about 100, g/kg (ASTM D 1510), and (C) coupling agent having a moiety reactive with hydroxyl groups (e.g. silanol groups) on the surface of said precipitated silica and another different moiety interactive with said diene-based elastomers.

In further accordance with this invention, said rubber composition for said aircraft tire tread has sulfur cured physical properties comprised of a relative abrasion resistance (relative volume loss, 10 Newtons force) (ASTM D 5963), of less than about 80 (e.g. within a range of from about 20 to about 80) and a hot rebound value (100° C.), (ASTM D-53512) in a range of from about 45 to about 70, and wherein, in additional accordance with this invention, said rubber composition has a Garvey Die uncured rubber composition extrudate visual Edge rating of 7 or better (e.g. from 7 about 9) and Surface rating of B or better (e.g. A or B), (according to ASTM D-2230-96).

Desirably, the aircraft tire tread rubber composition also has a tan delta value (100° C., 10 percent strain, 1 Hertz) in a range of from about 0.07 to about 0.17.

Desirably, the aircraft tire tread rubber composition also has a 300 percent ring modulus (ASTM D-412) in a range of from about 7 to about 12 MPa.

Desirably, the aircraft tire tread rubber composition also has a storage modulus (G') at 100° C., 10 percent strain, 1 Hertz, in a range of from about 750 to about 2,000 kPa; and Desirably, the said sulfur cured tread rubber composition also has an Instron Tear (100° C.) value in a range of about 100 to about 400 Newtons.

In practice, said specialized cis 1,4-polybutadiene elastomer may be prepared, for example, by organic solvent solution polymerization of 1,3-butadiene monomer in the presence of a catalyst comprised of an organonickel or organocobalt compound, an organoaluminum compound, a fluorine-containing compound, and a para styrenated diphenylamine which is exemplified in U.S. Pat. No. 5,451,646. Such catalyst components may be comprised of nickel octoate, triisobutylaluminum, hydrogen fluoride and para styrenated diphenylamine. It is considered herein that such specialized cis 1,4-polybutadiene may be suitably prepared by such polymerization without undue experimentation.

The relatively broad heterogeneity index (Mw/Mn ratio range of 3/1 to 5/1) of the specialized cis 1,4-polybutadiene elastomer is considered herein to be significant to promote improved processing of the unvulcanized rubber composition of which a major, rather than a minor, fraction of its rubber component is the specialized cis 1,4-polybutadiene rubber, in a sense of promoting a relatively smooth surfaced extrudate, as compared to similar and more typical cis 1,4-polybutadiene elastomers rubber having the aforesaid significantly higher molecular weight and significantly lower heterogeneity index in a range of from about 1.5/1 to about 2.5/1. The specialized cis 1,4-polybutadiene elastomer is also considered herein to be unique in that it is configured with a level, or degree, of branching.

In a further practice of this invention, the rubber reinforcing carbon black is required to contain a relatively cool running rubber reinforcing carbon black (in a sense of promoting a relatively low hysteresis rubber composition for which it provides reinforcement) by being a rubber reinforcing carbon black of the aforesaid relatively narrowly defined DBP and Iodine characteristic values. The relatively narrowly defined DBP value of the carbon black is indicative of the reinforcement character of the carbon black in a sense that higher DBP values promote greater reinforcement of the conjugated diene-based aircraft tire rubber composition, a phenomenon well known to those having skill in such art. The relatively narrowly defined Iodine value of the carbon black is indicative of the carbon black surface area and associated carbon black particle size in a sense that higher values (higher surface area) represents smaller size carbon blacks. Smaller size carbon blacks conventionally promote higher reinforcement of the diene-based elastomers with better tear resistance and better wear resistance yet, however, promote higher rates of internal heat build up and associated internal temperature rise, all being phenomenae well known to those having skill in such art. Accordingly carbon blacks having DBP values and Iodine values outside the aforesaid narrowly defined ranges are to be excluded from aircraft tire rubber composition of this invention.

For reference purposes, various rubber reinforcing carbon blacks, with their associated DBP values and Iodine values, are illustrated in *The Vanderbilt Rubber Handbook*, 1978, Page 417, according to their ASTM designations.

In the practice of this invention, the synthetic amorphous silica (e.g. precipitated silica) may be composed of aggregates of precipitated silica, which is intended to include precipitated aluminosilicates as co-precipitated silica and aluminum.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm³/100 g, and more usually about 100 to about 300 cm³/100 g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165 MP and Zeosil 165GR, silicas from J. M. Huber Corporation as, for example, Zeopol 8745 and Zeopol 8715, silicas from Degussa AG with, for example, designations VN2, VN3 and Ultrasil 7005 as well as other grades of silica, particularly precipitated silicas, which can be used for elastomer reinforcement.

A coupling agent is utilized with the silica to aid in its reinforcement of the rubber composition which contains the silica. Such coupling agent conventionally contains a moiety reactive with hydroxyl groups on the silica (e.g. precipitated silica) and another and different moiety interactive with the diene hydrocarbon based elastomer.

In practice, said coupling agent may be, for example, (A) a bis-(3-trialkylsilylalkyl) polysulfide, ((e.g. a bis-(3-triethoxysilylpropyl) polysulfide)), having an average of from 2 to about 4 and more preferably an average of from 2 to about 2.6 or from about 3.4 to about 4, connecting sulfur atoms in its polysulfidic bridge, or (B) a combination of a bis-(3-triethoxysilylpropyl) polysulfide having an average of from about 2 to about 2.6 connecting sulfur atoms in its polysulfidic bridge together with a bis-(3-triethoxysilylpropyl) polysulfide having an average of from about 3.4 to about 4 connecting sulfur atoms in its polysulfidic bridge, wherein said polysulfide having an average of from 2 to about 2.6 connecting sulfur atoms in its polysulfidic bridge (to the exclusion of such polysulfide having an average of from 3 to 4 connecting sulfur atoms in its polysulfidic bridge) is blended with said rubber composition in the absence of sulfur and sulfur vulcanization accelerator and wherein said polysulfide having an average of from about 3.4 to about 4 connecting sulfur atoms in its polysulfidic bridge is thereafter blended with said rubber composition in the presence of sulfur and at least one sulfur vulcanization accelerator, or (C) an alkoxyorganomercaptosilane composition of the general Formula (I) represented as:

$$(X)_n(R_7O)_{3-n}\text{—Si—}R_8\text{—SH} \qquad (I)$$

wherein X is a radical selected from a halogen, namely chlorine or bromine and preferably a chlorine radical, and from alkyl radicals having from one to 16, preferably from one through 4, carbon atoms, preferably selected from methyl, ethyl, propyl (e.g. n-propyl) and butyl (e.g. n-butyl) radicals; wherein $R_7$ is an alkyl radical having from 1 through 18, alternately 1 through 4, carbon atoms preferably selected from methyl and ethyl radicals and more preferably an ethyl radical; wherein $R_8$ is an alkylene radical having from one to 16, preferably from one through 4, carbon atoms, preferably a propylene radical; and n is an average value of from zero through 3, preferably zero, and wherein, in such cases where n is zero or 1, $R_7$ may be the same or different for each ($R_7O$) moiety in the composition, and (D) said alkoxyorganomercaptosilane of the general Formula (I) having its mercapto group capped with a moiety which uncaps its mercapto group upon heating the rubber composition to an elevated temperature.

Representative examples various alkoxyorganomercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

Such alkoxyorganomercaptosilanes may be capped with various moieties as discussed above.

A representative example of a capped alkoxyorganomercaptosilane coupling agent is a liquid 3-octanoylthio-1-propyltriethoxysilane as NXT™ Silane from the GE Silicones Company.

The coupling agent may, for example, alternatively be provided in a form of a pre-formed composite thereof with said precipitated silica and such composite added directly to the elastomer mixture.

For example, said silica (e.g. precipitated silica), or at least a portion of said silica, may be pre-treated prior to addition to said elastomer(s):

(A) with an alkylsilane of the general Formula (II), or (B) with said bis(3-triethoxysilylpropyl) polysulfide having an average of from about 2 to about 4 connecting sulfur atoms in its polysulfidic bridge, or (C) with said alkoxyorganomercaptosilane, particularly said capped alkoxyorganosilane, of the general Formula (I), or (D) with a combination of said alkylsilane of general Formula (I) and said bis(3-triethoxysilylpropyl) polysulfide having an average of from about 2 to about 4 connecting sulfur atoms in its polysulfidic bridge, or (E) with a combination of said alkylsilane of general Formula (II) and said organomercaptosilane of general Formula (I);

wherein said alkylsilane of the general Formula (I) is represented as:

wherein $R_6$ is an alkyl radical having from 1 to 18 carbon atoms, preferably from 1 through 4 carbon atoms; n is a value of from 1 through 3; X is a radical selected from the group consisting of halogens, preferably chlorine, and alkoxy groups selected from methoxy and ethoxy groups, preferably an ethoxy group.

A significant consideration for said pre-treatment of said silica is to reduce, or eliminate, evolution of alcohol in situ within the rubber composition during the mixing of the silica with said elastomer such as may be caused, for example, by reaction of such coupling agent contained within the elastomer composition with hydroxyl groups (e.g. silanol groups) contained on the surface of the silica.

In practice, said rubber reinforcing carbon black for said rubber composition is preferably a rubber reinforcing carbon black having an Iodine absorption value (ASTM D-1510) in a range of from about 70 to about 130, more preferably from 70 to 100, g/kg and a DBP adsorption value (ASTM D-2414) in a range of from about 60 to about 160 cc/100 g. Representative examples of such carbon blacks, according to their ASTM designations which may be found in *The Vanderbilt Rubber Handbook*, 13$^{th}$ Edition (1990) on Pages 416 and 417.

BRIEF DESCRIPTION OF THE ACCOMPANYING DRAWING

The accompanying drawings are presented in a form of a graph (FIG. 1) and a pictorial pentagraph (FIG. 2), as hereinbefore discussed, to provide a further understanding of the invention.

The Accompanying Drawing (Graphical Presentations)

In graphical presentation FIG. 1, rubber reinforcing carbon blacks are presented in box A. Particularly preferred rubber reinforcing carbon blacks are presented in box B, a carved out portion of box A.

For box A, included rubber reinforcing carbon blacks have a dibutylphthalate (DBP) value in a range of from 60 to 160 cc/100 gm and an Iodine value in a range of from about 70 to about 130 g/kg and are considered as being medium sized rubber reinforcing carbon blacks.

For box A, exemplary and illustrative of such included rubber reinforcing carbon blacks, according to their ASTM designations, are N220, N299, N326, N330 and N347 rubber reinforcing carbon blacks. For this invention is it intended that all of the ASTM designated N200 and N300 series rubber reinforcing carbon blacks are included which are considered as being relatively medium particle sized, medium surface area carbon blacks.

Rubber reinforcing carbon blacks having DBP and Iodine value properties outside of Box A are not to be included to any significant extent in the aircraft tire rubber composition of this invention representative of which include, for example, both higher and lower surface area carbon blacks such as, for example those according to their ASTM designations as N110, a smaller particle sized, higher surface area carbon black and N550, N660 and N990 larger particle sized, small surface area carbon blacks.

Box B, included within Box A, presents a significantly more narrowly defined medium particle sized, medium surface area rubber reinforcing carbon blacks as N347, N326 and N330 which have DBP values within in a range from 60 to 160 cc/100 gm and more narrowly defined Iodine values in a range of from 70 to 100 g/kg which excludes the higher reinforcing N220 and N299 carbon blacks with a higher Iodine values which have a higher propensity for internal heat generation within the aircraft tire tread rubber composition.

In the pentagraph presentation of FIG. 2, as hereinbefore discussed, a pictorial representation of significant desired physical properties for the aircraft tire tread rubber composition is illustrated for which improvements are typically desired. It is highly desired to simultaneously improve processability for the unvulcanized rubber composition (particularly in a sense of providing a smooth extrudate), reduce hysteresis (for the vulcanized tread in a sense of increased rebound values, thereby promoting less internal heat buildup within the tire tread), increase tear strength of the vulcanized tread rubber composition, increase abrasion resistance for the vulcanized tread rubber composition to promote reduction in rate of tread wear and therefore a longer tread life, and increase stiffness for the vulcanized tire tread rubber composition. It is generally considered a significant achievement by those having skill in the pertinent art to improve any one of such physical properties without sacrificing at least one of the other physical properties. Improvement of two or more of such physical properties without a reduction in one or more of the other physical properties is an even more difficult task. FIG. 2 is intended to present a graphically pictorial view of such physical properties to aid in emphasizing a novelty and primary emphasis of this invention insofar as depicting the aforesaid physical properties.

In practice, the rubber compositions may be prepared, for example, in a sequential series of at least two separate and individual preparatory internal rubber mixing steps, or stages, in which the diene-based elastomer is first mixed with the prescribed carbon black and/or silica in a subsequent, separate mixing step and followed by a final mixing step where curatives are blended at a lower temperature and for a substantially shorter period of time.

It is conventionally required after each mixing step that the rubber mixture is actually removed from the rubber mixer and cooled to a temperature of less than 40° C. and, for example, in a range of about 40° C. to about 20° C. and then added back to an internal rubber mixer for the next sequential mixing step, or stage.

The forming of the aircraft tire tread is contemplated to be by conventional means such as, for example, by extrusion of rubber composition to provide a shaped, unvulcanized rubber tread component (e.g. an extruded contoured tread strip which may, for example, be a tread cap to form a tread running surface or a tread cap/base layered construction with the tread base layer underlying the tread cap layer). Such forming of a tire tread component is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

It is readily understood by those having skill in the art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of, for example, from about 0.75 to about 2 being preferred.

Accelerators are used to control the time and/or temperature required for vulcanization. In one embodiment, a single accelerator system may be used, i.e., primary accelerator. A primary accelerator(s) may be used, for example, in an amount ranging from about 0.5 to about 5, alternately about 0.8 to about 4, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a secondary accelerator is used, it may be, for example, be a guanidine, dithiocarbamate or thiuram compound.

The mixing of the rubber composition can, for example, be accomplished by the aforesaid sequential mixing process. For example, the ingredients may be mixed in at least one sequential non-productive (preparatory) mixing stage followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

EXAMPLE I

Samples of rubber compositions were prepared and referred to in this Example as Samples 1 and 2, with Sample 1 being a Control Sample.

Control Sample 1 contained natural cis 1,4-polyisoprene, synthetic cis 1,4-polyisoprene, oil extended cis 1,4-polybutadiene and oil extended styrene/butadiene rubber together with N220 rubber reinforcing carbon black (inside of box A and outside of box B of FIG. 1).

Sample 2 contained natural cis 1,4-polyisoprene rubber and oil extended cis 1,4-polybutadiene rubber together with $N_2O_5$ rubber reinforcing carbon black (outside of both boxes A and B of FIG. 1) and precipitated silica with its coupling agent.

The rubber compositions were prepared by mixing in an internal rubber mixer using several sequential mixing stages, namely a first preparatory non productive mixing step in an internal rubber mixer for about 2 to 5 minutes to a temperature of about 160° C., a second non productive mixing stage in an internal rubber mixer for about 2 to 4 minutes to a temperature of about 150° C. and a final productive mixing stage in an internal rubber mixer for about 2 to 3 minutes to a temperature of about 110° C. Between the mixing stages the rubber composition was dumped from the mixer, sheeted out from an open roll mixer and allowed to cool to a temperature below 40° C.

The sulfur curative and accelerators are added in the productive mixing stage. Mixing rubber compositions in a series of individual and sequential non-productive and productive mixing stages is well known to those having skill in such art.

Ingredients used in the rubber Samples are illustrated in the following Table 1 with the parts and percentages shown by weight unless otherwise indicated.

TABLE 1

| Material | Control Sample 1 | Sample 2 |
|---|---|---|
| First Non-Productive Mix Step | | |
| Natural cis 1,4-polyisoprene rubber[1] | 30 | 30 |
| Synthetic cis 1,4-polyisoprene rubber[2] | 10 | 0 |
| Oil extended styrene/butadiene rubber[3] | 30 | 0 |
| Specialized cis 1,4-polybutadiene rubber[4] | 0 | 70 |
| Oil extended cis 1,4-polybutadiene rubber[5] | 30 | 0 |
| Carbon black (N220)[6] | 65 | 0 |
| Carbon black (N205)[7] | 0 | 30 |
| Methylene acceptor[8] | 1 | 0 |
| Paraffinic and microcrystalline wax[9] | 1 | 1.5 |
| Antidegradant[10] | 2 | 2.5 |
| Rubber processing oil and fatty acids[11] | 14 | 10 |
| Zinc oxide | 0 | 3 |
| Tackifying resin[12] | 2 | 0 |
| Second Non-Productive Mix Step | | |
| Tackifying resin[12] | 3 | 3 |
| Antidegradant[10] | 2.5 | 2.5 |
| Silica coupling agent[13] | 0 | 6 |
| Silica[14] | 0 | 30 |
| Productive Mix Step | | |
| Methylene donor[15] | 1 | 0 |
| Zinc oxide | 5 | 0 |
| Antidegradant(s)[16] | 2 | 1 |
| Sulfur | 0.8 | 1.2 |
| Accelerator(s)[17] | 2.5 | 2 |

[1]Natural cis 1,4-polyisoprene rubber (RSS #2)
[2]Synthetic cis 1,4-polyisoprene as NAT2200 ™ from The Goodyear Tire & Rubber Company
[3]Styrene/butadiene rubber as PLF1712C ™ from the Goodyear Tire & Rubber Company having a bound styrene content of about 23 percent from the Goodyear Tire & Rubber Company, oil extended with a rubber processing oil in an amount of 37.5 parts by weight per 100 parts by weight of the rubber and reported in Table 1 as the dry weight of the rubber
[4]Cis 1,4-polybutadiene elastomer as BUD1280 ™ from The Goodyear Tire & Rubber Company having a Tg of about −104° C., Mooney (ML1 + 4) viscosity of about 45, an Mn of about 127,000, an Mw of about 445,000, a broad heterogeneity index (HI) of about 3.5 and a cis 1,4-isomeric content of about 98 percent obtained by organic solvent polymerization of 1,3-butadiene monomer as described in the aforesaid U.S. Pat. No. 5,451,646
[5]Cis 1,4-polybutadiene elastomer as BUD1254 ™ from The Goodyear Tire & Rubber Company, oil extended with a rubber processing oil in an amount of 25 parts by weight per 100 parts by weight of the rubber and reported in Table 1 as the dry weight of the rubber
[6]N220 carbon black, an ASTM designation, having a DBP value of about 114 cc/100 g and an Iodine value of about 121 g/kg and included in box A, and outside of box B, of FIG 1N205 carbon black, an ASTM designation, having a DBP value of about 115 cc/100 g and an Iodine value of about 121 g/kg (outside of both boxes A and B of FIG 1)
[8]Resorcinol
[9]Rubber compounding waxes
[10]Of the amine type
[11]Rubber processing oil and fatty acids, primarily stearic acid
[12]Phenol formaldehyde type tackifying resin TABLE 1-continued

| Material | Control Sample 1 | Sample 2 |
|---|---|---|

[13]Composite of silica coupling agent and carbon black as a bis(3-triethoxysilylpropyl) polylsulfide, having an average of about 2.1 to about 2.4 connecting sulfur atoms in its polysulfidic bridge, and carbon black in a 50/50 weight ratio as Si266 ™ from Degussa
[14]Synthetic, amorphous, precipitated silica as HiSil 210 ™ from PPG Industries
[15]Hexamethoxymethylmelamine
[16]Antidegradants of the amine and quinoline types
[17]Sulfur vulcanization accelerators of the sulfenamide and guanidine types and retarder of the cyclohexylthiophthalimide type Various physical properties for rubber Samples of Table 1 are reported in the following Table 2. Cured Samples were cured at a temperature of about 150° C. for about 32 minutes.

TABLE 2

| | Control Sample 1 | Sample 2 |
|---|---|---|
| Natural cis 1,4-polyisoprene rubber | 30 | 30 |
| Synthetic cis 1,4-polyisoprene rubber | 10 | 0 |
| Oil extended styrene/butadiene rubber | 30 | 0 |
| Specialized cis 1,4-polybutadiene rubber | 0 | 70 |
| Oil extended cis 1,4-polybutadiene rubber | 30 | 0 |
| N220 Carbon black | 65 | 0 |
| N205 Carbon black | 0 | 30 |
| Silica | 0 | 30 |
| RPA, 100° C.[1] | | |
| G' storage mod., uncured, 15% strain, 0.833 Hz (kPa) G' storage | 212 | 224 |
| G' storage modulus at 1% strain (kPa), 1 Hz | 2662 | 3310 |
| G' storage modulus at 10% strain (kPa), 1 Hz | 1351 | 1870 |
| G' storage modulus at 50% strain (kPa), 1 Hz | 827 | 1076 |
| Tan delta at 10% strain | 0.171 | 0.152 |
| Rheometer, 150° C. (MDR)[2] | | |
| TS1 (dNm) | 3.14 | 3.23 |
| T25, minutes | 5.9 | 6.93 |
| T90, minutes | 16.13 | 22 |
| Delta torque (dNm) | 13.19 | 20.07 |
| Stress-strain (ATS)[3] | | |
| Modulus, ring, 100% | 1.72 | 2.24 |
| Modulus, ring, 300% | 7.26 | 9.1 |
| Tensile strength (MPa) | 16.85 | 17.99 |
| Elongation at break (%) | 573 | 540 |
| Hardness (Shore A)[4] | | |
| 23° C. | 69.4 | 72.9 |
| 100° C. | 61.4 | 68.7 |
| Rebound (%) | | |
| 23° C. | 35.4 | 43.8 |
| 100° C. | 49.6 | 53.6 |
| Tear strength, 95° C. (N)[5] | 242.1 | 236.8 |
| Abrasion resistance, relative volume loss (10 N)[6] | 121 | 60 |
| Garvey Die Rating[7] | | |
| Sample Edge rating | 7 | 3 |
| Sample Surface rating | A | C |

[1]Data obtained according to Rubber Process Analyzer as RPA 2000 ™ instrument by Alpha Technologies, formerly the Flexsys Company and formerly the Monsanto Company. References to an RPA-2000 instrument may be found in the following Publications: H. A. Palowski, et al, Rubber World, June 1992 and January 1997, as well as Rubber & Plastics News, April 26 and May 10, 1993. For example, G' storage modulii may be determined, for example, by the RPA instrument by measuring the strain sweep at 100° C. at 1 Hertz over a range of, for example, 1 to 50 percent strain. Such storage modulus (G') measurement for rubber samples is well known to those having skill in such art.

TABLE 2-continued

|  | Control Sample 1 | Sample 2 |
|---|---|---|

[2]Data obtained according to Moving Die Rheometer instrument, model MDR-2000 by Alpha Technologies, used for determining cure characteristics of elastomeric materials, such as for example torque, T90 etc.
[3]Data obtained according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[4]Shore A hardness according to ASTM D-1415
[5]Data obtained according to a peel strength adhesion (tear strength) test to determine cohesion between two samples of a rubber composition. In particular, such cohesion is determined by pulling one rubber composition away from itself at a right angle to the untorn test specimen with the two ends of the rubber compositions being pulled apart at a 180° angle to each other using an Instron instrument.
[6]DIN abrasion value as a relative volume loss (e.g. cc loss) relative to a control according to ASTM D 5963 with the force being applied as 10 Newtons.
[7]Garvey Die Rating according to ASTM D 2230-96 using an ASTM Extrusion Die, Garvey type (paragraph 5.2 therein) and the rubber Samples of this Example (instead of the standard compound of paragraph 6, et al, therein). The visual Rating System "B" was used (per paragraph 9.1 therein) in which a rating ranging from 1 (poor) to 10 (excellent) was used for grading the sharpness and continuity of the 30° edge of the rubber Sample (the edge in Table 1 herein) and a rating ranging from A (excellent) to E (poor) was used for grading the smoothness of the surface of the rubber Sample (the Surface in Table 1 herein).

From Table 2 it is observed that a significantly beneficial increased resistance to abrasion of 60 is observed for Sample 2 which contained the high content of the specialized cis 1,4-polybutadiene, as compared to Control Sample 2 with its significantly higher abrasion resistance of 120. This is indicative of reduced rate of tread wear for an aircraft tire having a tread of such rubber composition.

In a sense, the increased resistance to abrasion of Sample 2 (significantly reduced DIN value), as compared to Control Sample 1, might have been expected since it had a significantly greater amount (actually a major content) of the specialized cis 1,4-polybutadiene rubber (70 phr) as compared to the minor amount of 30 phr of a cis 1,4-polybutadiene rubber in Control Sample 1.

However, rubber Sample 2 exhibited significantly poorer rubber processing as compared to Control Sample 1 in a sense of its extrudate surface having a visual Garvey die edge rating of only 3 as compared to a Garvey die edge rating of 7 for Control Sample 1 and a visual Garvey surface rating of only C for rubber Sample 2 as compared to a Garvey die surface rating of A for Control Sample 1. Accordingly, it is considered herein that the usefulness of the rubber composition of Sample 2 is significantly inhibited and less than optimal for application as an aircraft tire tread.

EXAMPLE II

Samples of rubber compositions were prepared and referred to in this Example as Samples 3 and 4, with Sample 3 being a Control Sample.

Control Sample 3 contained cis 1,4-polybutadiene rubber and natural cis 1,4-polyisoprene rubber together with reinforcing filler as a combination of N347 rubber reinforcing carbon black (Box B of FIG. 1) and silica with its coupling agent.

Sample 4 contained a specialized cis 1,4-polybutadiene rubber and natural cis 1,4-polyisoprene rubber together with reinforcing filler as a combination of N347 rubber reinforcing carbon black (box B of FIG. 1) and silica with its coupling agent.

The rubber compositions were prepared in the manner of Example I.

The rubber compositions are illustrated in the following Table 3.

TABLE 3

| Material | Control Sample 3 | Sample 4 |
|---|---|---|
| First Non-Productive Mix Step | | |
| Cis 1,4-polybutadiene rubber[1] | 80 | 0 |
| Specialized cis 1,4-polybutadiene rubber[2] | 0 | 80 |
| Natural rubber[3] | 20 | 20 |
| Carbon black (N347)[4] | 40 | 40 |
| Paraffinic and microcrystalline wax[5] | 2 | 2 |
| Rubber processing oil and fatty acids[6] | 10 | 10 |
| Zinc oxide | 3 | 3 |
| Second Non-Productive Mix Step | | |
| Tackifying resin[7] | 3 | 3 |
| Antidegradant[8] | 2.5 | 2.5 |
| Silica coupling agent[9] | 3.5 | 3.5 |
| Silica[10] | 17.5 | 17.5 |
| Productive Mix Step | | |
| Antidegradant(s)[11] | 1 | 1 |
| Sulfur | 1.2 | 1.2 |
| Accelerator(s)[12] | 2.4 | 2.4 |

[1]Budene 1208 ™ from The Goodyear Tire & Rubber Company having a Tg of about −104° C., Mooney (ML1 + 4) viscosity of about 45, an Mn of about 209,000, an Mw of about 481,000, a relatively narrow heterogeneity index (HI) of about 2.3 and a cis 1,4-isomeric content of about 98 percent
[2]Budene 1280 ™ from The Goodyear Tire & Rubber Company
[3]Natural cis 1,4-polyisoprene rubber (RSS#2)
[4]N347 carbon black, an ASTM designation, having a DBP value of about 124 cc/100 g and an Iodine value of about 90 g/kg included in box B of FIG 1Rubber compounding waxes
[6]Rubber processing oil and fatty acids, primarily stearic acid
[7]Phenol formaldehyde type tackifying resin
[8]Of the amine type
[9]Composite of silica coupling agent and carbon black as Si266 ™ from Degussa
[10]Synthetic, amorphous, precipitated silica as HiSil 210 ™ from PPG Industries
[11]Antidegradants of the amine and quinoline types
[12]Sulfur vulcanization accelerators of the sulfenamide and guanidine types and retarder of the cyclohexylthiophthalimide type Various physical properties for rubber Samples of Table 3 are reported in the following Table 4. Cured Samples were cured at a temperature of about 150° C. for about 32 minutes.

TABLE 4

|  | Control Sample 3 | Sample 4 |
|---|---|---|
| Cis 1,4-polybutadiene rubber | 80 | 0 |
| Specialized cis 1,4-polybutadiene rubber | 0 | 80 |
| Carbon black N347 | 40 | 40 |
| Silica | 17.5 | 17.5 |
| RPA, 100° C.[1] | | |
| G' uncured, 15% strain, 0.833 Hz (kPa) | 184 | 188 |
| G' at 1% strain, 1 Hz (kPa) | 2051 | 2285 |
| G' at 10% strain, 1 Hz (kPa) | 1612 | 1394 |
| G' at 50% strain, 1 Hz (kPa) | 1131 | 941 |
| Tan delta at 10% strain | 0.112 | 0.127 |
| Rheometer, 150° C. (MDR)[2] | | |
| Maximum torque (dNm) | 18.09 | 16.44 |
| Minimum torque (dNm) | 2.62 | 2.65 |
| T90, minutes | 9.65 | 10.64 |
| Delta torque (dNm) | 15.47 | 13.79 |

TABLE 4-continued

|  | Control Sample 3 | Sample 4 |
|---|---|---|
| Stress-strain (ATS)[3] | | |
| Modulus, ring, 100% | 1.91 | 1.8 |
| Modulus, ring, 300% | 8.52 | 8.44 |
| Tensile strength (MPa) | 14.83 | 16.27 |
| Elongation at break (%) | 479 | 521 |
| Hardness (Shore A)[4] | | |
| 23° C. | 69.1 | 66.8 |
| 100° C. | 62.4 | 60.4 |
| Rebound (%) | | |
| 23° C. | 48.7 | 46.7 |
| 100° C. | 59.9 | 58 |
| Specific gravity | 1.125 | 1.124 |
| Tear strength, 95° C. (N)[5] | 206 | 216 |
| Abrasion resistance, relative volume loss (10 N)[6] | 46 | 49 |
| Garvey Die Rating[7] | | |
| Sample Edge rating | 3 | 8 |
| Sample Surface rating | C | A |

The footnotes for this Table 4 are the same as for the footnotes of Table 2 unless otherwise indicated.

From Table 4 it is observed that the Garvey Die Edge Rating of 8 for the extrudate of Sample 4 is a significant improvement over the Edge Rating of only 3 for the extrudate of Control Sample 3.

It is further observed that the Garvey Die Surface Rating of A for the extrudate of Sample 4 is a significant improvement over the Surface Rating of only C for the extrudate of Control Sample 3.

These observations show that an aircraft tire tread rubber composition reinforced with both carbon black and precipitated silica and which contains a major portion of its rubber component as the specialized cis 1,4-polybutadiene rubber can be prepared which has a significant combination of both good abrasion resistance for the vulcanized rubber composition and good processability for the unvulcanized rubber composition. The good processability is observed by the Garvey die ratings which indicate a relatively smooth surface appearance for the unvulcanized rubber composition extrudate.

EXAMPLE III

Samples of rubber compositions were prepared and referred to in this Example as Samples 5 and 6, with Sample 5 being a Control Sample.

Control Sample 5 contained a specialized cis 1,4-polybutadiene rubber and natural cis 1,4-polyisoprene rubber together with reinforcing filler as N347 rubber reinforcing carbon black, illustrated in box B of FIG. 1 of the accompanying drawings. Sample 4 contained the specialized cis 1,4-polybutadiene rubber and natural cis 1,4-polyisoprene rubber together with reinforcing filler as the N347 rubber reinforcing carbon black together with precipitated silica with its coupling agent.

The rubber compositions were prepared in the manner of Example I.

Ingredients used in the rubber Samples are illustrated in the following Table 5.

TABLE 5

| Material | Control Sample 5 | Sample 6 |
|---|---|---|
| First Non-Productive Mix Step | | |
| Specialized cis 1,4-polybutadiene rubber[1] | 75 | 75 |
| Natural rubber[2] | 25 | 25 |
| Carbon black (N347)[3] | 55 | 40 |
| Paraffinic and microcrystalline wax[4] | 1.5 | 1.5 |
| Rubber processing oil and fatty acids[5] | 10 | 10 |
| Zinc oxide | 3 | 3 |
| Second Non-Productive Mix Step | | |
| Tackifying resin[6] | 3 | 3 |
| Antidegradant[7] | 2.5 | 2.5 |
| Silica coupling agent[8] | 0 | 4 |
| Silica[9] | 0 | 20 |
| Productive Mix Step | | |
| Antidegradants[10] | 2 | 2 |
| Sulfur | 1.4 | 1.4 |
| Metaphenylene bis-maleimide | 1.5 | 1.5 |
| Accelerator(s)[11] | 2.7 | 2.7 |

[1]Budene ® 1280 from The Goodyear Tire & Rubber Company
[2]Natural cis 1,4-polyisoprene rubber (RSS#2)
[3]N347 carbon black, an ASTM designation, having a DBP value of about 124 cc/100 g and an Iodine value of about 90 g/kg and included in box B of FIG 1.
[4]Rubber compounding waxes
[5]Rubber processing oil and fatty acids, primarily stearic acid
[6]Phenol formaldehyde type tackifying resin
[7]Of the amine type
[8]Composite of silica coupling agent and carbon black as Si266 ™ from Degussa
[9]Synthetic, amorphous, precipitated silica as HiSil 210 ™ from PPG Industries
[10]Antidegradants of the amine and quinoline types
[11]Sulfur vulcanization accelerators of the sulfenamide and guanidine types and retarder of the cyclohexylthiophthalimide type Various physical properties for rubber Samples of Table 5 are reported in the following Table 6. Cured Samples were cured at a temperature of about 150° C. for about 32 minutes.

TABLE 6

|  | Control Sample 5 | Sample 6 |
|---|---|---|
| Silica | 0 | 20 |
| Carbon black | 55 | 40 |
| Coupler composite (coupler and carbon black) | 0 | 4 |
| RPA, 100° C.[1] | | |
| G' uncured, 15% strain, 0.833 Hz (kPa) | 166 | 188 |
| G' at 1% strain, 1 Hz (kPa) | 2805 | 2832 |
| G' at 10% strain, 1 Hz (kPa) | 1725 | 1773 |
| G' at 50% strain, 1 Hz (kPa) | 1088 | 1092 |
| Tan delta at 10% strain | 0.125 | 0.13 |
| Rheometer, 150° C. (MDR)[2] | | |
| Maximum torque (dNm) | 17.75 | 16.61 |
| Minimum torque (dNm) | 2.13 | 2.3 |
| T90, minutes | 9.28 | 13.44 |
| Delta torque (dNm) | 15.62 | 14.31 |
| Stress-strain (ATS)[3] | | |
| Modulus, ring, 100% | 2.22 | 2.26 |
| Modulus, ring, 300% | 11.35 | 9.4 |
| Tensile strength (MPa) | 16.35 | 16.17 |
| Elongation at break (%) | 425 | 501 |
| Hardness (Shore A)[4] | | |
| 23° C. | 72.7 | 73.2 |
| 100° C. | 64.7 | 64.8 |

TABLE 6-continued

|  | Control Sample 5 | Sample 6 |
|---|---|---|
| Rebound (%) | | |
| 23° C. | 49.2 | 44.8 |
| 100° C. | 58.3 | 55.3 |
| Tear strength, 95° C. (N)[5] | 219 | 319 |
| Abrasion resistance, relative volume loss (10 N)[6] | 65 | 58 |
| Garvey die rating[7] | | |
| Sample Edge rating | 7 | 8 |
| Sample Surface rating | A | A |

The footnotes for this Table 6 are the same as the footnotes for Table 2 unless otherwise indicated.

From Table 6 it is observed that the elongation at break for Sample 6, as compared to Control Sample 5, is significantly greater which is considered herein as being indicative of promoting improved tread crack resistance for an aircraft tire tread of such rubber composition. The improvement in ultimate elongation and significant improvement in tear strength values for Sample 6 as compared to Control Sample 5 is indicative of a rubber composition with good durability and crack resistance for an aircraft tire of such rubber composition.

From Table 4 it is further observed that the Garvey Die Edge Rating of 8 for the extrudate of Sample 6 is equivalent to Edge Rating of 7 for the extrudate of Control Sample 5.

It is further observed that the Garvey Die Surface Rating of A for the extrudate of Sample 6 is essentially equivalent to the Surface Rating of A for the extrudate of Control Sample 5.

Thus, Sample 6 is considered herein to exhibit good processability in a sense of providing relative smooth surfaced extrudates without rough or ragged edges.

From Table 6 it is also observed that the tear strength (resistance to tear) of Sample 6, as compared to Control Sample 5, is significantly greater which is also indicative of increased durability and reduced susceptibility to rib throws and chip chunking and overall damage during service for an aircraft tire tread of such composition.

EXAMPLE IV

Samples of rubber compositions were prepared and referred to in this Example as Samples 7 and 8, with Sample 7 being a Control Sample.

Control Sample 7 contained a specialized cis 1,4-polybutadiene rubber and natural cis 1,4-polyisoprene rubber together with reinforcing filler as a combination of N205 rubber reinforcing carbon black (box B of FIG. 1) and silica with its coupling agent.

Sample 8 also contained a specialized cis 1,4-polybutadiene rubber and natural cis 1,4-polyisoprene rubber together with reinforcing filler as a combination of rubber reinforcing carbon black and silica with its coupling agent but used an N347 rubber reinforcing carbon black (box A of FIG. 1) instead of the N205 carbon black reinforcing filler of Control Sample 7.

The rubber compositions were prepared in the manner of Example I.

The rubber compositions are illustrated in the following Table 7.

TABLE 7

| Material | Control Sample 7 | Sample 8 |
|---|---|---|
| First Non-Productive Mix Step | | |
| Specialized cis 1,4-polybutadiene rubber[1] | 70 | 70 |
| Natural rubber[2] | 30 | 30 |
| Carbon black (N347)[3] | 0 | 40 |
| Carbon black (N205)[4] | 40 | 0 |
| Paraffinic and microcrystalline wax[5] | 1.5 | 1.5 |
| Rubber processing oil and fatty acids[6] | 7 | 7 |
| Zinc oxide | 3 | 3 |
| Second Non-Productive Mix Step | | |
| Tackifying resin[7] | 3 | 3 |
| Antidegradant[8] | 2.5 | 2.5 |
| Silica coupling agent[9] | 4 | 4 |
| Silica[10] | 20 | 20 |
| Productive Mix Step | | |
| Antidegradants[11] | 2 | 2 |
| Sulfur | 1.2 | 1.2 |
| Phenylene diamalemide | 1.5 | 1.5 |
| Accelerator(s)[12] | 2.7 | 2.7 |

[1]Budene ® 1280 from The Goodyear Tire & Rubber Company
[2]Natural cis 1,4-polyisoprene rubber (RSS#2)
[3]N347 carbon black, an ASTM designation, having a DBP value of about 124 cc/100 g and an Iodine value of about 90 g/kg and included in box B of FIG 1.
[4]N205 carbon black, an ASTM designation, having a DBP value of about 115 cc/100 g and an Iodine value of about 121 g/kg and included in box A (although not specifically shown) of FIG 1Rubber compounding waxes
[6]Rubber processing oil and fatty acids, primarily stearic acid
[7]Phenol formaldehyde type tackifying resin
[8]Of the amine type
[9]Composite of silica coupling agent and carbon black as Si266 ™ from Degussa
[10]Synthetic, amorphous, precipitated silica as HiSil 210 ™ from PPG Industries
[11]Antidegradants of the amine and quinoline types
[12]Sulfur vulcanization accelerators of the sulfenamide and guanidine types and retarder of the cyclohexylthiophthalimide type Various physical properties for rubber Samples of Table 7 are reported in the following Table 8. Cured Samples were cured at a temperature of about 150° C. for about 32 minutes.

TABLE 8

|  | Sample 7 | Sample 8 |
|---|---|---|
| Carbon black N347 | 0 | 40 |
| Carbon black N205 | 40 | 0 |
| RPA, 100° C.[1] | | |
| G' uncured, 15% strain, 0.833 Hz (kPa) | 196 | 179 |
| G' at 1% strain, 1 Hz (kPa) | 3198 | 2428 |
| G' at 10% strain, 1 Hz (kPa) | 1698 | 1541 |
| G' at 50% strain, 1 Hz (kPa) | 965 | 989 |
| Tan delta at 10% strain | 0.171 | 0.136 |
| Rheometer, 150° C. (MDR)[2] | | |
| Maximum torque (dNm) | 19.37 | 17.8 |
| Minimum torque (dNm) | 2.98 | 2.6 |
| T90, minutes | 13.55 | 14.19 |
| Delta torque (dNm) | 16.39 | 15.2 |
| Stress-strain (ATS)[3] | | |
| Modulus, ring, 100% | 1.81 | 1.95 |
| Modulus, ring, 300% | 7.64 | 9.19 |
| Tensile strength (MPa) | 18.1 | 17.57 |
| Elongation at break (%) | 592 | 537 |

TABLE 8-continued

|  | Sample 7 | Sample 8 |
|---|---|---|
| Hardness (Shore A)[4] | | |
| 23° C. | 73.3 | 69.9 |
| 100° C. | 63.6 | 62 |
| Rebound (%) | | |
| 23° C. | 40.6 | 44.2 |
| 100° C. | 49.4 | 55.4 |
| Tear strength, 95° C. (N)[5] | 350 | 231 |
| Abrasion resistance, relative volume loss (10 N)[6] | 84 | 76 |
| Garvey Die Rating[7] | | |
| Sample Edge rating | 7 | 8 |
| Sample Surface rating | A | A |

The footnotes for Table 8 are the same as the footnotes for Table 2 unless otherwise noted.

From Table 8 it is observed that the N347 carbon black, a lower hysteresis promoting rubber reinforcing carbon black (used in Sample 8) is well suited for an aircraft tread rubber composition, as compared to Control Sample 7 in which the N205 carbon black is used, due to the rubber composition's relatively low hysteresis behavior as shown by its relatively low tan delta and relatively high hot 100° C. rebound value. The low hysteresis characteristic of the rubber composition of Sample 8 will enable the rubber composition to generate lower internal heat build up for an aircraft tire tread.

Accordingly, it is concluded herein that the utilization of a rubber reinforcing carbon black in Box B of FIG. 2 of the drawings is particularly beneficial (even more so than a rubber reinforcing carbon black in Box A but outside of Box B of FIG. 2) in combination with the specialized cis 1,4-polybutadiene rubber as a major rubber constituent in the polybutadiene/natural cis 1,4-polyisoprene rubber aircraft tire tread rubber composition of this invention. The reinforcement of the rubber composition with the medium sized rubber reinforcing carbon black in Box B (N347), as compared to other rubber reinforcing carbon blacks in Box A (e.g. N220 and N299) is also considered herein to be particularly beneficial in the sense of its relatively lower level of resultant internal heat generation within the rubber composition during dynamic application.

While certain representative embodiments and details have been shown for the purpose of illustrating the invention, it will be apparent to those skilled in this art that various changes and modifications may be made therein without departing from the spirit or scope of the invention.

What is claimed is:

1. An aircraft tire having a tread of a rubber composition comprised of, based upon parts by weight per 100 parts by weight rubber (phr):
  (A) diene-based elastomers consisting essentially of
    (1) about 55 to about 95 phr of cis 1,4-polybutadiene elastomer having a microstructure comprised of about 96 to about 99 percent cis 1,4-isomeric units, about 0.1 to about 1 percent trans 1,4-isomeric units and from about 1 to about 3 percent vinyl 1,2-isomeric units; a number average molecular weight (Mn) in a range of from about 75,000 to about 150,000 and a heterogeneity index (Mw/Mn) in a range of from about 3/1 to about 5/1;
    (2) about 5 to about 45 phr of cis 1,4 polyisoprene natural rubber;
  (B) about 20 to about 120 phr of reinforcing filler as a combination of:
    (1) about 10 to about 60 phr of particulate precipitated silica, and
    (2) about 10 to about 60 phr of rubber reinforcing carbon black having a DBP (dibutyl phthalate) value of about 124 cc/100 g and an Iodine value of about 90 g/kg and
  (C) coupling agent comprised of a bis(3-triethoxysilylpropyl) polysulfide having an average of from about 2 to about 2.6 connecting sulfur atoms in its polysulfidic bridge.

2. The aircraft tire of claim 1 wherein said tread composition has a storage modulus (G') at 100° C., 10 percent strain, 1 Hertz, in a range of from about 750 to about 2,000 kPa.

* * * * *